United States Patent
Liu et al.

(10) Patent No.: US 11,513,718 B2
(45) Date of Patent: Nov. 29, 2022

(54) METHOD, ELECTRONIC DEVICE AND COMPUTER PROGRAM PRODUCT FOR CONFIGURING BUFFER SIZE ASSOCIATED WITH BACKUP THREADS

(71) Applicant: EMC IP Holding Company LLC, Hopkinton, MA (US)

(72) Inventors: Jie Liu, Chengdu (CN); Qin Liu, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 17/161,298

(22) Filed: Jan. 28, 2021

(65) Prior Publication Data

US 2022/0083227 A1    Mar. 17, 2022

(30) Foreign Application Priority Data

Sep. 15, 2020   (CN) .......................... 202010965809.3

(51) Int. Cl.

| | |
|---|---|
| *G06F 3/06* | (2006.01) |
| *H04L 67/1097* | (2022.01) |
| *H04L 41/16* | (2022.01) |
| *H04L 41/082* | (2022.01) |
| *G06N 3/04* | (2006.01) |
| *H04L 67/01* | (2022.01) |

(52) U.S. Cl.
CPC ............. *G06F 3/065* (2013.01); *G06F 3/067* (2013.01); *G06F 3/0619* (2013.01); *G06F 3/0653* (2013.01); *G06F 3/0656* (2013.01); *G06N 3/04* (2013.01); *H04L 41/082* (2013.01); *H04L 41/16* (2013.01); *H04L 67/1097* (2013.01); *H04L 67/01* (2022.05)

(58) Field of Classification Search
CPC ........ G06F 3/065; G06F 3/067; G06F 3/0656; G06F 3/0653
USPC ......................................................... 711/162
See application file for complete search history.

(56) References Cited

U.S. PATENT DOCUMENTS

| | | | |
|---|---|---|---|
| 11,169,714 B1 * | 11/2021 | Li .......................... | G06F 16/178 |
| 2006/0047998 A1 * | 3/2006 | Darcy ................... | G06F 3/0656 |
| | | | 714/6.12 |

* cited by examiner

*Primary Examiner* — Than Nguyen (74) *Attorney, Agent, or Firm* — Chamberlain, Hrdlicka, White, Williams & Aughtry (57) ABSTRACT

A method, electronic device, and computer readable medium for managing a backup system is disclosed. The method includes acquiring a state of the backup system. The backup system includes a backup server and at least one backup client terminal, the backup server using multiple threads to back up data from the at least one backup client terminal to a persistent storage device via a buffer. The method also includes determining a reward score corresponding to the state of the backup system and determining configuration information for the backup system based on the state and the reward score of the backup system. The configuration information indicating at least one of the number of the multiple threads and the size of the buffer. The number of writing threads and the size of the buffer for the persistent storage device may be dynamically adjusted based on the state of the backup system.

17 Claims, 5 Drawing Sheets

METHOD, ELECTRONIC DEVICE AND COMPUTER PROGRAM PRODUCT FOR CONFIGURING BUFFER SIZE ASSOCIATED WITH BACKUP THREADS

CROSS-REFERENCE TO RELATED APPLICATION

This application claims priority to Chinese Patent Application No. 202010965809.3 filed on Sep. 15, 2020. Chinese Patent Application No. 202010965809.3 is hereby incorporated by reference in its entirety.

TECHNICAL FIELD

Embodiments of the present disclosure generally relate to the field of data storage, and in particular, to a method, an electronic device, and a computer program product for managing a backup system.

BACKGROUND

In order to avoid data loss, a backup system is usually used to save data. The backup system usually comprises a backup server and a backup client terminal, wherein the backup client terminal is connected to the backup server via a network, and the backup server is used to back up data at the backup client terminal.

In conventional backup systems, the backup server usually backs up data from the backup client terminal to a persistent storage device, such as a hard disk drive (HDD). In order to improve the performance of the backup system, in view of the read and write characteristics of hard disk drives, conventional solutions have proposed several optimization solutions for hard disk drive-based backup systems. With the development of new persistent storage devices such as solid state disks (SSD), more and more storage vendors have begun to release SSD-based backup systems. However, the conventional optimization solutions for hard disk drive-based backup systems often cannot be applied to SSD-based backup systems.

SUMMARY OF THE INVENTION

Embodiments of the present disclosure provide a method, an electronic device, and a computer program product for managing a backup system.

In a first aspect of the present disclosure, a method for managing a backup system is provided. The method includes acquiring a state of a backup system. The backup system includes a backup server and at least one backup client terminal, and the backup server uses multiple threads to back up data from the at least one backup client terminal to a persistent storage device via a buffer. The method also includes determining a reward score corresponding to the state of the backup system, and determining configuration information for the backup system based on the state and the reward score of the backup system. The configuration information indicates at least one of the number of the multiple threads and the size of the buffer.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to acquire a state of a backup system. The backup system includes a backup server and at least one backup client terminal, and the backup server uses multiple threads to back up data from the at least one backup client terminal to a persistent storage device via a buffer. The method includes determining a reward score corresponding to the state of the backup system, and determining configuration information for the backup system based on the state and the reward score of the backup system. The configuration information indicates at least one of the number of the multiple threads and the size of the buffer.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the methods described herein.

The Summary of the Invention section is provided in order to introduce the selection of concepts in a simplified form, which will be further described in the Detailed Description below. The Summary of the Invention section is not intended to identify key features or essential features of the present disclosure, nor is it intended to limit the scope of the present disclosure.

BRIEF DESCRIPTION OF THE DRAWINGS

The above and other objects, features, and advantages of the present disclosure will become more apparent by describing the example embodiments of the present disclosure in more detail in combination with the accompanying drawings. In the example embodiments of the present disclosure, the same reference numerals generally represent the same parts.

In each figure, the same or corresponding reference numerals represent the same or corresponding parts.

DETAILED DESCRIPTION

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, that is, "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As described above, in order to ensure that data at a backup client terminal will not be lost, the data at the backup client terminal needs to be backed up to a storage server regularly. In conventional backup systems, the backup server usually backs up the data from the backup client terminal to an HDD. In order to improve the performance of the backup system, in view of the read and write characteristics of HDDs, conventional solutions have proposed several optimization solutions for hard disk drive-based backup systems. For example, before writing data to an HDD, first writing the to-be-written data into a buffer, thereby reducing the seek time of the HDD and avoiding using multiple threads to write to the same HDD, and so on.

With the development of SSDs, more and more storage vendors have begun to release SSD-based backup systems. The reading and writing of SSDs have their own characteristics. For example, 1) page is the smallest write unit of SSD, so it is necessary to ensure that data written each time is aligned by page to avoid write amplification; 2) when data written at one time is large and then the write time is long, the garbage collection mechanism of SSD will affect its read and write performance, so it is necessary to avoid writing data that is too large at one time; and 3) multiple threads can be used to improve the read and write performance of SSD. However, when a small number of read and write threads have occupied a large amount of bandwidth of a SSD, increasing the number of threads will reduce the overall read and write performance.

Embodiments of the present disclosure provide solutions for managing a backup system. In such solutions, a state of a backup system is acquired, where the backup system includes a backup server and at least one backup client terminal. The backup server use multiple threads to back up data from the at least one backup client terminal to a persistent storage device via a buffer. A reward score corresponding to the state of the backup system is determined. In addition, configuration information for the backup system is determined using a neural network and based on the state and the reward score of the backup system. The configuration information indicates at least one of the number of the multiple threads and the size of the buffer. In this way, embodiments may dynamically adjust the number of writing threads and the size of the buffer for the persistent storage device (e.g., an SSD) based on the state of the backup system, thereby improving the performance of the backup system and reducing the management overhead. Embodiments disclosed herein may take into account the read and write characteristics of different persistent storage devices and make full use of the advantages of the different persistent storage devices. It should be understood that, in addition to being applicable to SSD-based backup systems, Embodiments are also applicable to backup systems based on other persistent storage devices.

Figure 1:
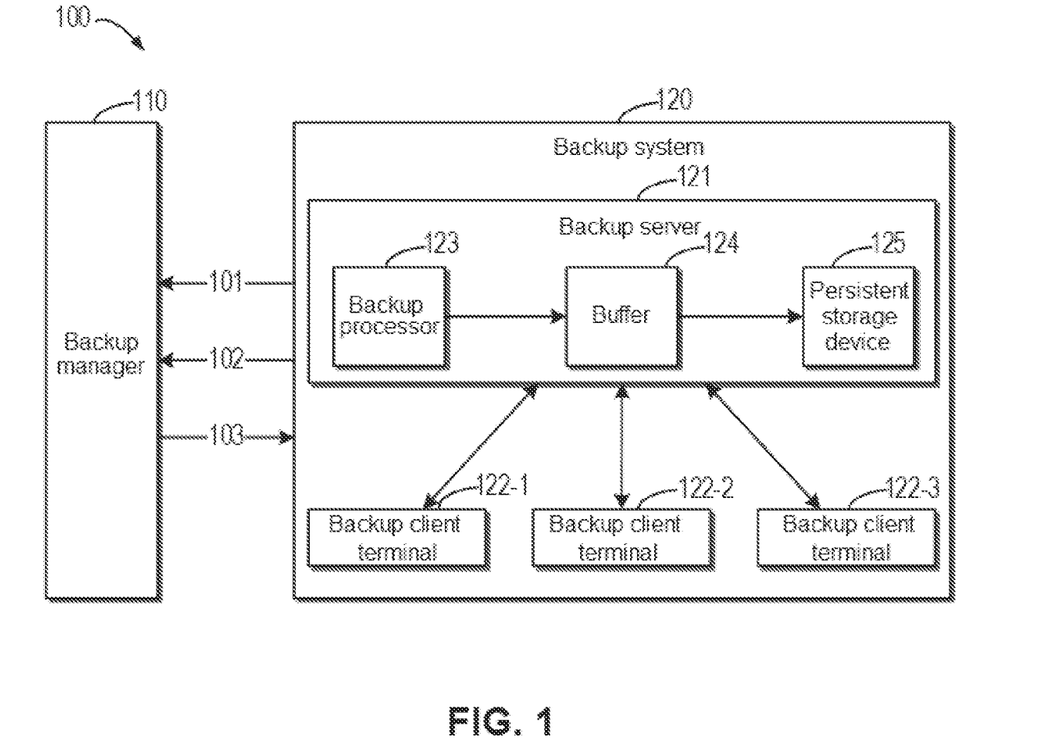
FIG. 1 shows a schematic diagram of an example environment in which embodiments of the present disclosure may be implemented.

Hereinafter, the embodiments of the present disclosure will be further described in detail with reference to the accompanying drawings. FIG. 1 shows a block diagram of example environment 100 in which the embodiments of the present disclosure may be implemented. It should be understood that the structure of environment 100 is described only for illustrative purposes, and does not imply any limitation to the scope of the present disclosure.

As shown in FIG. 1, environment 100 includes backup manager 110 and backup system 120. Backup manager 110 may be implemented, for example, by using any physical host, server, virtual machine, etc. Backup system 120 may include backup server 121 and multiple backup client terminals 122-1, 122-2, and 122-3 (collectively or individually referred to as "backup client terminal 122"). Backup server 121 and/or backup client terminal 122 may be implemented, for example, by using any physical host, server, virtual machine, etc.

Backup server 121 communicates with backup client terminal 122 via a network (not shown in FIG. 1), and backup server 121 may be used to back up data at one or more backup client terminals 122. As shown in FIG. 1, backup server 121 may include backup processor 123, buffer 124, and persistent storage device 125 (for example, the SSD, and so on). Backup processor 123 may receive the backup data from backup client terminal 122 and cache it in buffer 124 in the memory. When the amount of data in buffer 124 reaches a certain threshold, backup processor 123 may write the data in buffer 124 to persistent storage device 125. Since the performance of read and write operations of the memory far exceeds the read and write performance of persistent storage device 125, backing up the backup data from backup client terminal 122 to persistent storage device 125 via buffer 124 can effectively improve the read and write performance of data backup. In order to further improve the backup performance, backup processor 123 may use multiple threads to back up the backup data from backup client terminal 122 to persistent storage device 125 (for example, the SSD).

In some embodiments, backup manager 110 may obtain state 101 of backup system 120. State 101 may include, for example, the state of backup server 121 (also referred to as the "server state"), the state of multiple backup client terminals 122 (also referred to as the "client terminal state"), and/or the network state of the network for communication between backup client terminals 122 and backup server 121.

In some embodiments, the state of backup server 121 may include, for example, at least one of the following: a backup success rate of backup server 121, storage usage condition of persistent storage device 125 (for example, the storage space occupancy rate), CPU usage condition at backup server 121 (for example, the CPU occupancy rate during the execution of data backup for one or more backup client terminals 122), memory usage condition at backup server 121 (for example, the memory occupancy rate during the execution of data backup for one or more backup client terminals 122), and input/output (I/O) operation usage condition for persistent storage device 125 (for example, the read and write bandwidth occupancy rate during the execution of data backup for one or more backup client terminals 122). In some embodiments, the state of each backup client terminal 122 may include, for example, at least one of the following: the number of files to be backed up at backup client terminal 122, the size of data to be backed up at backup client terminal 122, an average execution time for backup tasks of backup client terminal 122, a success rate for the backup tasks of backup client terminal 122 (for example, 0-100%), etc. In some embodiments, the network state may include a round-trip delay of the network and/or a network bandwidth available for data backup.

It should be understood that the foregoing lists of indicators that can be used as the state of backup system 120 are for the purposes of example and not limitation. In some embodiments, the state of backup system 120 may include other indicators. In some embodiments, before being used, the indicator to be used as the state of backup system 120 may be preprocessed using any known or to-be-developed algorithm (for example, a batch normalization algorithm). The scope of the present disclosure is not limited in this regard.

In some embodiments, the backup manager 110 may determine a reward score 102 for the state 101 of backup system 120. The reward score 102 may be, for example, a reward for a last backup action performed for backup system 120, and the reward score may be obtained based on state 101 of backup system 120. In some embodiments, the backup server 121 may include multiple backup tasks for executing data backup on multiple backup client terminals 122. In such embodiments, each backup task may correspond to one backup client terminal 122 and each backup client terminal 122 may correspond to one or more backup tasks (for example, different backup tasks may be created for different data types or different disks at each backup client terminal 122). In some embodiments, the state 101 of the backup system 120 may indicate an execution time and an execution result (for example, success or failure) of the last execution of each of the multiple backup tasks. In some embodiments, the backup manager 110 may determine reward score 102 based on the execution time and the execution result of the last execution of each of the multiple backup tasks, as shown in the following Formula (1):

$$R = \sum_{n=1}^{N}\left(\frac{P_n}{\log T_n} - (1 - P_n)\right) \quad (1)$$

where N represents the number of backup tasks; $T_n$ represents the execution time of the last execution of the nth backup task; and $P_n$ represents the execution result of the last execution of the nth backup task. For example, 1 means success, and 0 means failure. It can be seen from Formula (1) that when a backup task in the backup system is successfully completed in less time, a higher reward score may be obtained. The reward score 102 may be used to measure whether current state 101 of backup system 120 is good or not. In other embodiments, the reward score 102 may also be determined based on other information indicated in state 101 of backup system 120.

In some embodiments, the backup manager 110 may determine the configuration information 103 for backup system 120 based on state 101 and reward score 102 of backup system 120. The configuration information 103 may correspond to a backup action to be executed by backup system 120 in accordance with embodiments disclosed herein. For example, the configuration information 103 may indicate the size of buffer 124 and/or the number of I/O threads used by backup processor 123. Hereinafter, the "configuration information" for the backup system is sometimes referred to as "backup action." The backup manager 110 may configure configuration information 103 to backup server 121, so that backup server 121 can execute a corresponding backup action in accordance with embodiments disclosed herein.

For example, at the initial stage, there may be only a small number of I/O threads for persistent storage device 125 at backup server 121. At this moment, the backup server 121 may start some new backup tasks. Backup manager 110 may obtain state 101 of backup system 120, and determine that in order to make full use of the read and write bandwidth of persistent storage device 125, the backup data should be written to persistent storage device 125 as soon as possible. Therefore, in accordance with embodiments disclosed herein, the backup manager 110 may determine that the backup action to be performed is to increase the number of I/O threads used by backup processor 123 while reducing the size of buffer 124. For another example, in some cases, there have already been a large number of I/O threads for persistent storage device 125 at backup server 121. At this moment, the backup server 121 may start some new backup tasks. The backup manager 110 obtains state 101 of backup system 120, and determines that the read and write bandwidth of persistent storage device 125 has been largely occupied, and the number of threads should be reduced to improve the execution efficiency of these I/O threads. Therefore, the backup manager 110 may determine that the backup action to be performed is to reduce the number of I/O threads used by backup processor 123 while increasing the size of buffer 124 in accordance with one or more embodiments disclosed herein.

In some embodiments, the backup manager 110 may determine, by using a neural network and based on state 101 and reward score 102 of backup system 120, a backup action 103 to be executed by backup system 120. This neural network may be designed, for example, based on a deep deterministic policy gradient (DDPG) algorithm to achieve continuous control. The DDPG algorithm is designed based on a deep Q network (DQN), and improves the stability and convergence of an Actor-Critic network, thus making it more suitable for handling backup planning issues for backup systems.

Figure 2:
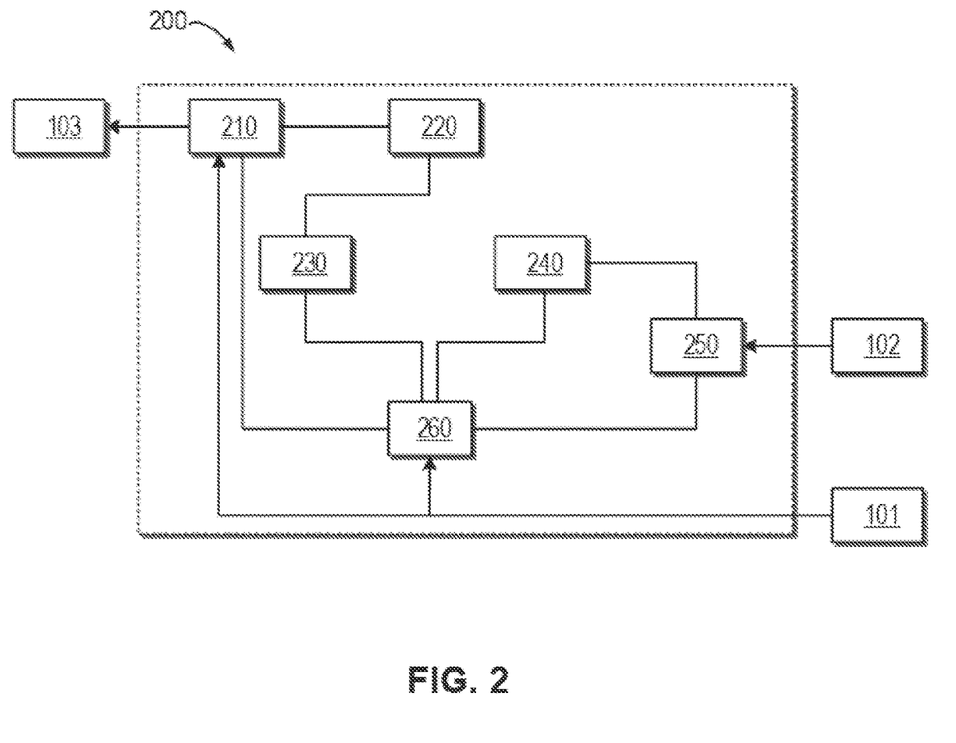
FIG. 2 shows a schematic block diagram of a neural network for managing a backup system according to one or more embodiments of the present disclosure.

FIG. 2 shows a schematic block diagram of neural network 200 for managing a backup system according to one or more embodiments of the present disclosure. A neural network 200 may be implemented, for example, at backup manager 110 as shown in FIG. 1.

As shown in FIG. 2, the neural network 200 may include an actor network 210 and a critic network 260, both of which can receive state 101 of backup system 120. The actor network 210 and critic network 260 may be coupled to each other. The neural network 200 may further include action gradient module 220 and policy gradient module 230, both of which may be used to update a network parameter of actor network 210 based on an output of critic network 260. Hereinafter, action gradient module 220 and policy gradient module 230 are also collectively referred to as a "first sub-network" for updating the network parameter of actor network 210. The neural network 200 may also include a time difference (TD) error module 240 and a target Q network 250, both of which may be used to update a network parameter of critic network 260 based on the output of critic network 260 and reward score 102 corresponding to state 101. Hereinafter, TD error module 240 and target Q network 250 are also collectively referred to as a "second sub-network" for updating the network parameter of critic network 260.

Figure 3A:
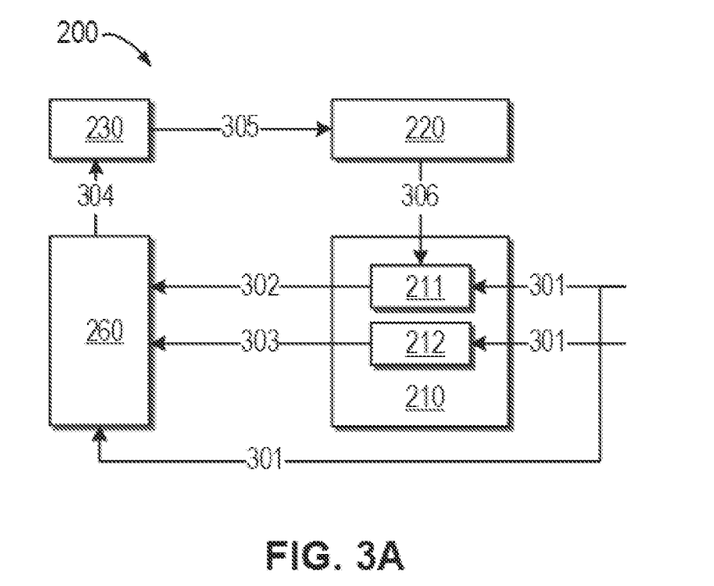
FIG. 3A shows a schematic diagram for training an actor network according to one or more embodiments of the present disclosure.

FIG. 3A shows a schematic diagram for training actor network 210 according to one or more embodiments of the present disclosure. As shown in FIG. 3A, the actor network 210 may include an actor evaluation network 211 and an actor target network 212. A network parameter (also referred to as a "first network parameter") of the actor evaluation network 211 may be updated following the training of the actor network 210, and a network parameter of actor target network 212 is usually determined based on empirical values and may be constant in accordance with one or more embodiments disclosed herein.

In accordance with embodiments disclosed herein, the actor evaluation network 211 and actor target network 212 may receive state 301 of backup system 120 for the current moment (for example, it may be state 101 as shown in FIG. 1). The actor evaluation network 211 may determine a backup action 302 for the current moment based on state 301 acquired at the current moment and the first network parameter. The actor target network 212 may determine a target backup action 303 for the current moment based on state 301 acquired at the current moment. The backup action 302 and target backup action 303 may be provided to critic network 260. The critic network 260 may generate assessment 304 of backup action 302 based on backup action 302, target backup action 303, and state 301 of backup system 120 at the current moment, and provide assessment 304 to action gradient module 230. The action gradient module 230 may determine an action gradient 305 of assessment 304 to backup action 302, and provide the action gradient 305 to the policy gradient module 220. The policy gradient module 220 may determine a policy gradient 306 of the first network parameter to the backup action 302, where the action gradient 305 may determine how fast the policy gradient rises. The policy gradient 306 may be used to update the network parameter (i.e., the first network parameter) of the actor evaluation network 211, so that the actor evaluation network 211 may determine a backup action for a next moment (for example, after the backup action 302 is applied to the backup system 120) based on the state of backup system 120 acquired at the next moment and the updated first network parameter. During the training of the actor network 210, the policy gradient module 220 and the network parameter of the actor evaluation network 211 may be updated.

Figure 3B:
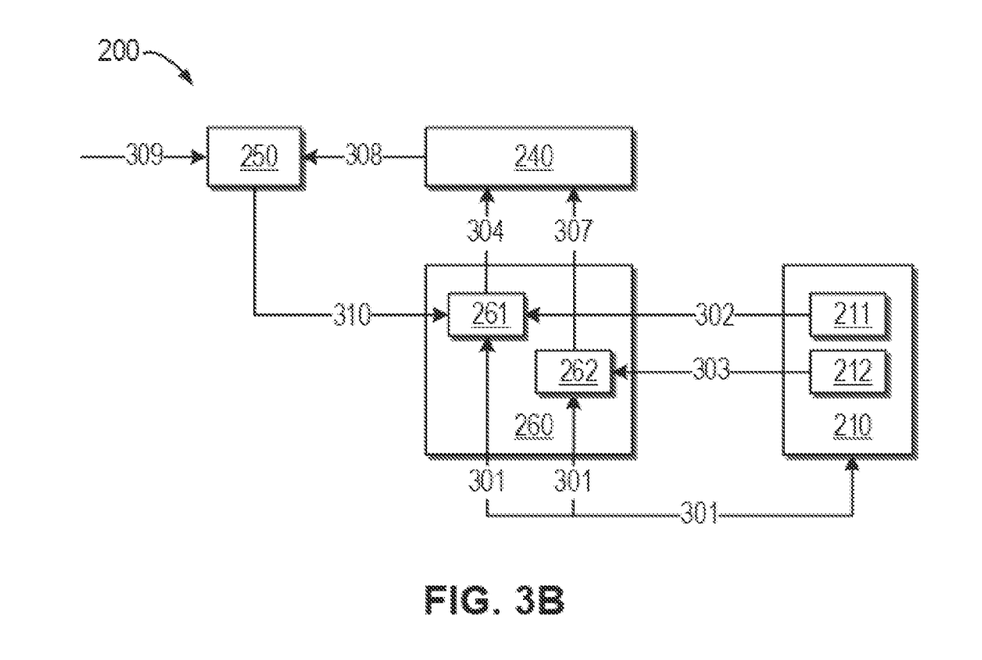
FIG. 3B shows a schematic diagram for training a critic network according to one or more embodiments of the present disclosure.

FIG. 3B shows a schematic diagram for training critic network 260 according to one or more embodiments of the present disclosure. As shown in FIG. 3B, the critic network 260 may include a critic evaluation network 261 and a critic target network 262. A network parameter of the critic evaluation network 261 (also referred to as a "second network parameter") may be updated following the training of the critic network 260, and a network parameter of critic target network 262 may be determined based on empirical values and may be constant in accordance with one or more embodiments disclosed herein.

In accordance with one or more embodiment disclosed herein, the antic evaluation network 261 may receive a backup action 302 for the current moment provided by the actor evaluation network 211, and determine an assessment 304 of backup action 302 based on state 301 of backup system 120 at the current moment and the second network parameter. The critic target network 262 may receive a target backup action 303 for the current moment provided by the actor target network 212, and determine a target assessment 307 of target backup action 303 based on state 301 of backup system 120 for the current moment. The assessment 304 and target assessment 307 may be provided to TD error module 240. The TD error module 240 may determine an error 308 between the assessment 304 and the target assessment 307, and provide the error 308 to the target Q network 250. The target Q network 250 may generate, based on a reward score 309 (for example, the reward score 102 of FIG. 1) corresponding to the state 301 and the error 308, an output 310 for updating the network parameter (i.e., the second network parameter) of the critic evaluation network 261. The critic evaluation network 261 may determine, based on the state of backup system 120 acquired at a next moment (for example, after the backup action 302 is applied to the backup system 120) and the updated second network parameter, an assessment for a backup action for the next moment provided by actor evaluation network 211. During the training of critic network 260, the TD error module 240, target Q network 250, and the network parameter of critic evaluation network 261 may be updated.

In this way, by training the actor network 210 and the critic network 260, the neural network 200 as shown in FIG. 2 may automatically adjust the configuration information (i.e., the backup action) for the backup system 120 in real time based on the acquired state of backup system 120, thereby improving the performance of backup system 120. Because a large number of manual operations for managing the backup system are replaced by artificial intelligence, the management overhead of backup system 120 will be greatly reduced.

Figure 4:
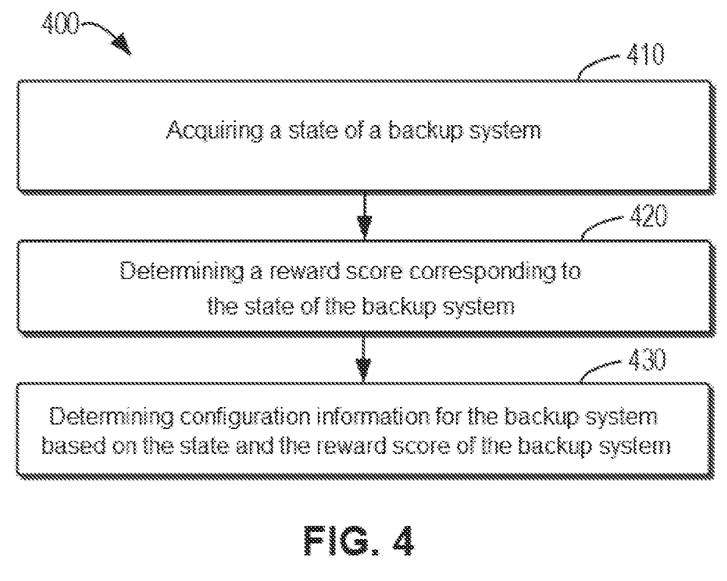
FIG. 4 shows a flowchart of an example method for managing a backup system according to one or more embodiments of the present disclosure.

FIG. 4 shows a flowchart of an example method 400 for managing a backup system according to one or more embodiments of the present disclosure. For example, the method 400 may be executed by backup manager 110 as shown in FIG. 1. The method 400 is described in detail below with reference to FIG. 1. It should be understood that the method 400 may further include additional actions not shown and/or may omit actions shown. The scope of the present disclosure is not limited in this regard.

At block 410, the backup manager 110 acquires a state of a backup system. The backup system may include a backup server and at least one backup client terminal, the backup server using multiple threads to back up data from the at least one backup client terminal to a persistent storage device via a buffer.

In some embodiments, the state of the backup system includes at least one of the following: a server state of the backup server; a client terminal state of each of the at least one backup client terminal; and a network state of a network for communication between the at least one backup client terminal and the backup server.

In some embodiments, the server state includes at least one of the following: a backup success rate of the backup server; storage usage condition of the backup server; CPU usage condition of the backup server; memory usage condition of the backup server; and input/output operation usage condition for the persistent storage device.

In some embodiments, the client terminal state of the backup client terminal includes at least one of the following: the number of files to be backed up at the backup client terminal; the size of data to be backed up at the backup client terminal; an average execution time for backup tasks of the backup client terminal; and a success rate for the backup tasks of the backup client terminal.

In some embodiments, the network state includes at least one of the following: a round-trip delay of the network and an available network bandwidth of the network.

In some embodiments, the persistent storage device includes a solid state disk.

At block 420, the backup manager 110 determines a reward score corresponding to the state of the backup system.

In some embodiments, the backup server includes multiple backup tasks for executing data backup on the at least one backup client terminal, and the state of the backup system indicates an execution time and an execution result of last execution of each of the multiple backup tasks. In some embodiments, determining the reward score includes: determining the reward score based on the execution time and the execution result of the last execution of each of the multiple backup tasks.

At block 430, the backup manager 110 determines configuration information for the backup system based on the state and the reward score of the backup system, the configuration information indicating at least one of the number of multiple threads and the size of the buffer.

In some embodiments, determining the configuration information includes: determining the configuration information for the backup system using a neural network and based on the state of the backup system and the reward score.

In some embodiments, the neural network includes an actor network and a critic network, the actor network including an actor evaluation network and an actor target network, and the critic network including a critic evaluation network and a critic target network. The neural network further includes a first sub-network for updating a first network parameter of the actor evaluation network and a second sub-network for updating a second network parameter of the critic evaluation network.

In some embodiments, the actor evaluation network is configured to determine the configuration information for the backup system at a current moment based on the state of the backup system acquired at the current moment and the first network parameter of the actor evaluation network, the configuration information being provided to the critic evaluation network.

In some embodiments, the actor target network is configured to determine target configuration information for the backup system at the current moment based on the state of the backup system acquired at the current moment, the target configuration information being provided to the critic target network.

In some embodiments, the critic evaluation network is configured to determine an assessment for the configuration information based on the state of the backup system acquired at the current moment and the second network parameter of the critic evaluation network, the assessment being provided to the first sub-network and the second sub-network.

In some embodiments, the critic target network is configured to determine a target assessment for the target configuration information based on the state of the backup system acquired at the current moment, the target assessment being provided to the second sub-network.

In some embodiments, the first sub-network is configured to update the first network parameter based on the assessment.

In some embodiments, the second sub-network is configured to update the second network parameter based on a difference between the assessment and the target assessment as well as the reward score.

Figure 5:
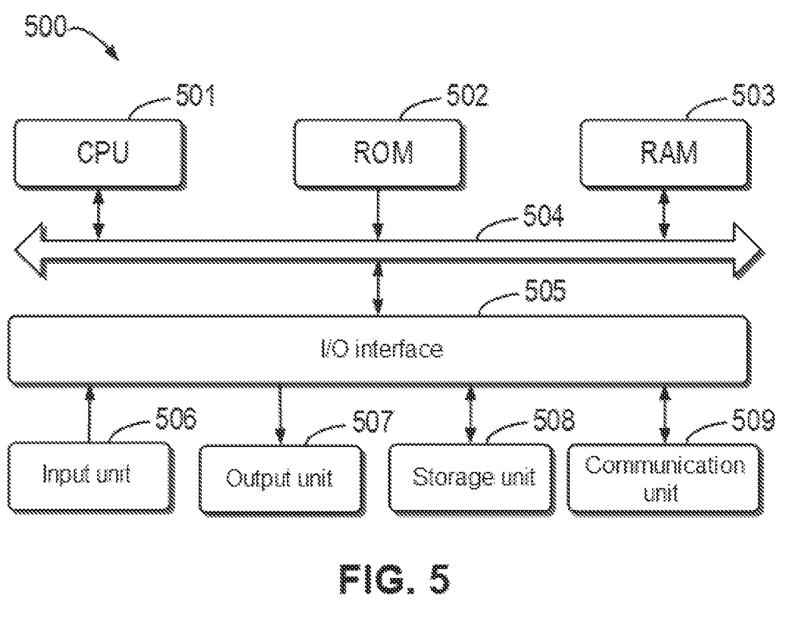
FIG. 5 shows a schematic block diagram of an example device that can be used to implement one or more embodiments of the present disclosure.

FIG. 5 shows a schematic block diagram of example device 500 that may be configured to implement one or more embodiments of the present disclosure. For example, the backup manager 110 shown in FIG. 1 may be implemented by device 500. As shown in FIG. 5, the device 500 may include a central processing unit (CPU) 501 that may perform various appropriate actions and processing according to computer program instructions stored in read-only memory (ROM) 502 or computer program instructions loaded from storage unit 508 into random access memory (RAM) 503. In RAM 503, various programs and data required for the operation of storage device 500 may be stored. The CPU 501, ROM 502, and RAM 503 are connected to each other through bus 504. An Input/output (I/O) interface 505 may also be connected to bus 504.

In accordance with embodiments disclosed herein, Multiple components in device 500 may be connected to the I/O interface 505, including, but not limited to: an input unit 506, such as a keyboard and a mouse; an output unit 507, such as various types of displays and speakers; a storage unit 508, such as a magnetic disk and an optical disk; and a communication unit 509, such as a network card, a modem, and a wireless communication transceiver. The communication unit 509 allows the device 500 to exchange information/data with other devices via a computer network such as the Internet and/or various telecommunication networks.

Various processes and processing described above, for example, method 400, may be performed by processing unit 501. For example, in some embodiments, the method 400 may be implemented as a computer software program that is tangibly included in a machine-readable medium such as storage unit 508. In some embodiments, some or all of the computer program may be loaded and/or installed onto device 500 via ROM 502 and/or communication unit 509. When the computer program is loaded into RAM 503 and executed by CPU 501, one or more actions of method 400 described above may be performed.

The present disclosure may be embodied in a method, an apparatus, a system, and/or a computer program product. The computer program product may include a non-transitory computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include, but are not limited to: a portable computer disk, a hard disk drive, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used here is not construed as transient signals per se, such as radio waves or other freely propagating electromagnetic waves, electromagnetic waves propagating through waveguides or other transfer media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transfer cables, optical fiber transfer, wireless transfer, routers, firewalls, switches, gateway computers, and/or edge servers. A network adapter card or network interface in each computing/processing device may receive computer-readable program instructions from the network and forward the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, such as a programmable logic circuit, an FPGA, or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to multiple embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not intended to be limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the various embodiments disclosed herein.

The invention claimed is:

1. A method for managing a backup system, comprising:
acquiring a state of a backup system, wherein the backup system comprises a backup server and at least one backup client terminal, the backup server using multiple threads to back up data from the at least one backup client terminal to a persistent storage device via a buffer, wherein the backup server comprises multiple backup tasks for executing data backup on the at least one backup client terminal, and the state of the backup system indicates an execution time and an execution result of last execution of each of the multiple backup tasks, and determining the reward score comprises:
determining the reward score based on the execution time and the execution result of the last execution of each of the multiple backup tasks;
determining a reward score corresponding to the state of the backup system; and
determining configuration information for the backup system based on the state and the reward score of the backup system, the configuration information indicating at least one of the multiple threads and the size of the buffer.

2. The method according to claim 1, wherein the state of the backup system comprises at least one of the following:
a server state of the backup server;
a client terminal state of each of the at least one backup client terminal; and
a network state of a network for communication between the at least one backup client terminal and the backup server.

3. The method according to claim 2, wherein the server state comprises at least one of the following:
- a backup success rate of the backup server;
- storage usage condition of the persistent storage device;
- CPU usage condition of the backup server;
- memory usage condition of the backup server; and
- input/output operation usage condition for the persistent storage device.

4. The method according to claim 2, wherein the client terminal state of the backup client terminal comprises at least one of the following:
- the number of files to be backed up at the backup client terminal;
- the size of data to be backed up at the backup client terminal;
- an average execution time for backup tasks of the backup client terminal; and
- a success rate for the backup tasks of the backup client terminal.

5. The method according to claim 2, wherein the network state comprises at least one of the following:
- a round-trip delay of the network; and
- an available network bandwidth of the network.

6. The method according to claim 1, wherein determining the configuration information comprises:
- determining the configuration information using a neural network and based on the state and the reward score of the backup system.

7. The method according to claim 6, wherein the neural network comprises an actor network and a critic network, the actor network comprising an actor evaluation network and an actor target network, the critic network comprising a critic evaluation network and a critic target network, and the neural network further comprises a first sub-network for updating a first network parameter of the actor evaluation network and a second sub-network for updating a second network parameter of the critic evaluation network, and wherein
- the actor evaluation network is configured to determine the configuration information for the backup system at a current moment based on the state of the backup system acquired at the current moment and the first network parameter of the actor evaluation network, the configuration information being provided to the critic evaluation network;
- the actor target network is configured to determine target configuration information for the backup system at the current moment based on the state of the backup system acquired at the current moment, the target configuration information being provided to the critic target network;
- the critic evaluation network is configured to determine an assessment for the configuration information based on the state of the backup system acquired at the current moment and the second network parameter of the critic evaluation network, the assessment being provided to the first sub-network and the second sub-network;
- the critic target network is configured to determine a target assessment for the target configuration information based on the state of the backup system acquired at the current moment, the target assessment being provided to the second sub-network;
- the first sub-network is configured to update the first network parameter based on the assessment; and
- the second sub-network is configured to update the second network parameter based on a difference between the assessment and the target assessment as well as the reward score.

8. The method according to claim 1, wherein the persistent storage device comprises a solid state disk.

9. An electronic device, comprising:
- at least one processing unit; and
- at least one memory which is coupled to the at least one processing unit and stores instructions for execution by the at least one processing unit, wherein the instructions, when executed by the at least one processing unit, cause the electronic device to perform actions comprising:
- acquiring a state of a backup system, wherein the backup system comprises a backup server and at least one backup client terminal, the backup server using multiple threads to back up data from the at least one backup client terminal to a persistent storage device via a buffer, wherein the backup server comprises multiple backup tasks for executing data backup on the at least one backup client terminal, and the state of the backup system indicates an execution time and an execution result of last execution of each of the multiple backup tasks, and determining the reward score comprises:
  - determining the reward score based on the execution time and the execution result of the last execution of each of the multiple backup tasks;
- determining a reward score corresponding to the state of the backup system; and
- determining configuration information for the backup system based on the state and the reward score of the backup system, the configuration information indicating at least one of the multiple threads and the size of the buffer.

10. The electronic device according to claim 9, wherein determining the configuration information comprises:
- determining the configuration information using a neural network and based on the state and the reward score of the backup system.

11. The electronic device according to claim 10, wherein the neural network comprises an actor network and a critic network, the actor network comprising an actor evaluation network and an actor target network, the critic network comprising a critic evaluation network and a critic target network, and the neural network further comprises a first sub-network for updating a first network parameter of the actor evaluation network and a second sub-network for updating a second network parameter of the critic evaluation network, and wherein
- the actor evaluation network is configured to determine the configuration information for the backup system at a current moment based on the state of the backup system acquired at the current moment and the first network parameter of the actor evaluation network, the configuration information being provided to the critic evaluation network;
- the actor target network is configured to determine target configuration information for the backup system at the current moment based on the state of the backup system acquired at the current moment, the target configuration information being provided to the critic target network;
- the critic evaluation network is configured to determine an assessment for the configuration information based on the state of the backup system acquired at the current moment and the second network parameter of the critic evaluation network, the assessment being provided to the first sub-network and the second sub-network;
- the critic target network is configured to determine a target assessment for the target configuration information based on the state of the backup system acquired at the current moment, the target assessment being provided to the second sub-network;

the first sub-network is configured to update the first network parameter based on the assessment; and the second sub-network is configured to update the second network parameter based on a difference between the assessment and the target assessment as well as the reward score.

12. The electronic device according to claim 9, wherein the persistent storage device comprises a solid state disk.

13. The electronic device according to claim 9, wherein the state of the backup system comprises at least one of the following:

a server state of the backup server;

a client terminal state of each of the at least one backup client terminal; and a network state of a network for communication between the at least one backup client terminal and the backup server.

14. The electronic device according to claim 13, wherein the server state comprises at least one of the following:

a backup success rate of the backup server;

storage usage condition of the persistent storage device;

CPU usage condition of the backup server;

memory usage condition of the backup server; and input/output operation usage condition for the persistent storage device.

15. The electronic device according to claim 13, wherein the network state comprises at least one of the following:

a round-trip delay of the network; and an available network bandwidth of the network.

16. A non-transitory computer readable medium comprising instructions that, when executed by a processor, perform a method for managing a backup system, the method comprising:

acquiring a state of a backup system, wherein the backup system comprises a backup server and at least one backup client terminal, the backup server using multiple threads to back up data from the at least one backup client terminal to a persistent storage device via a buffer, wherein the backup server comprises multiple backup tasks for executing data backup on the at least one backup client terminal, and the state of the backup system indicates an execution time and an execution result of last execution of each of the multiple backup tasks, and determining the reward score comprises:

determining the reward score based on the execution time and the execution result of the last execution of each of the multiple backup tasks;

determining a reward score corresponding to the state of the backup system; and determining configuration information for the backup system based on the state and the reward score of the backup system, the configuration information indicating at least one of the multiple threads and the size of the buffer.

17. The non-transitory computer readable medium according to claim 16, wherein determining the configuration information comprises:

determining the configuration information using a neural network and based on the state and the reward score of the backup system.

\* \* \* \* \*